(12) United States Patent
Adkins (10) Patent No.: US 10,167,680 B2
(45) Date of Patent: Jan. 1, 2019

(54) MULTI-LEAD QUICK CONNECT THREADED CONNECTION

(71) Applicant: Hunting Energy Services, Inc., Houston, TX (US)

(72) Inventor: Gregory Lynn Adkins, Lafayette, LA (US)

(73) Assignee: Hunting Energy Services, Inc., Houston, TX (US)

( * ) Notice: Subject to any disclaimer, the term of this patent is extended or adjusted under 35 U.S.C. 154(b) by 357 days.

(21) Appl. No.: 15/148,057

(22) Filed: May 6, 2016

(65) Prior Publication Data

US 2017/0074051 A1 Mar. 16, 2017

Related U.S. Application Data

(60) Provisional application No. 62/216,596, filed on Sep. 10, 2015.

(51) Int. Cl.
*F16L 15/00* (2006.01)
*E21B 17/042* (2006.01)
*E21B 17/046* (2006.01)

(52) U.S. Cl.
CPC .......... *E21B 17/042* (2013.01); *E21B 17/046* (2013.01); *F16L 15/00* (2013.01)

(58) Field of Classification Search
CPC ....... F16L 15/00; F16L 15/001; F16L 15/003; F16L 15/008; F16L 15/06
USPC .................................. 285/333, 355, 390, 391
See application file for complete search history.

(56) References Cited

U.S. PATENT DOCUMENTS

| 2,450,453 | A | * | 10/1948 | Boehm | ................ E21B 17/042 |
| | | | | | 285/115 |
| 2,565,547 | A | * | 8/1951 | Collins | ................... E21B 17/06 |
| | | | | | 285/3 |
| 2,907,589 | A | * | 10/1959 | Knox | .................... E21B 17/042 |
| | | | | | 285/332.2 |
| 4,124,229 | A | * | 11/1978 | Ahlstone | ............... F16L 15/003 |
| | | | | | 285/18 |

(Continued)

FOREIGN PATENT DOCUMENTS

| WO | 9405893 | | 3/1994 |
| WO | 2005001234 | A1 | 1/2005 |
| WO | 2015032659 | A1 | 3/2015 |

*Primary Examiner* — Aaron M Dunwoody
(74) *Attorney, Agent, or Firm* — Whitaker Chalk Swindle & Schwartz PLLC; Charles Gunter (57) ABSTRACT

A torque-less threaded connection is shown for connecting a drill tool to a drill string for use in horizontal directional drilling operations. An up-hole end portion has a female, box end opening with a non-threaded, slightly tapered first circumferential surface having a first median inner diameter; a non-threaded, slightly tapered second circumferential surface having a second inner diameter that is larger than the first diameter. A threaded tapered section extends between the first and second circumferential surfaces. The threaded tapered section has threads thereon which make up a multi-lead thread form. The downhole end portion of the coupling has mating external pin surfaces for engaging the internal surfaces of the up-hole end portion. A torque collar slides over portions of the up-hole and downhole end portions and prevents relative rotation between the downhole and up-hole portions and prevents toque from being transmitted to the threaded portions of the connection.

6 Claims, 10 Drawing Sheets

(56) References Cited

U.S. PATENT DOCUMENTS

| | | | | |
|---|---|---|---|---|
| 4,253,687 A * | 3/1981 | Maples | ............... | E21B 17/0423 285/332.3 |
| 4,717,183 A * | 1/1988 | Nobileau | .............. | E21B 17/042 285/334 |
| 4,735,444 A * | 4/1988 | Skipper | ................. | F16L 15/008 285/288.1 |
| 4,846,508 A * | 7/1989 | Pallini, Jr. | ............. | E21B 17/085 285/148.19 |
| 5,078,430 A * | 1/1992 | St. Onge | ................. | F16L 1/036 285/15 |
| 5,810,401 A * | 9/1998 | Mosing | .............. | E21B 17/0426 285/333 |
| 6,158,785 A | 12/2000 | Beaulier et al. | | |
| 6,485,061 B1 * | 11/2002 | Mosing | ................ | F16L 15/008 285/333 |
| 6,860,514 B2 * | 3/2005 | Wentworth | ............. | E21B 17/04 285/333 |
| 7,455,329 B2 | 11/2008 | Muradov et al. | | |
| 8,136,846 B2 | 3/2012 | Church | | |
| 8,225,885 B2 | 7/2012 | Wentworth et al. | | |
| 8,991,490 B2 | 3/2015 | Langenfeld et al. | | |
| 9,016,366 B2 * | 4/2015 | Langenfeld | ............. | E21B 17/03 166/242.6 |
| 2003/0155768 A1 * | 8/2003 | Hollingsworth | ........ | F16L 47/02 285/333 |
| 2004/0174017 A1 | 9/2004 | Brill et al. | | |
| 2005/0087985 A1 * | 4/2005 | Mosing | ............... | F16L 37/2445 285/391 |
| 2008/0105765 A1 * | 5/2008 | Camp | ................... | F16L 15/006 239/532 |
| 2015/0027734 A1 * | 1/2015 | Pacheco | ................. | F16L 15/06 166/380 |
| 2015/0285009 A1 * | 10/2015 | Bennett | ................ | E21B 17/042 285/333 |
| 2017/0268298 A1 * | 9/2017 | Magnuson | ............ | E21B 17/042 |
| 2017/0328140 A1 * | 11/2017 | D'Silva | ............... | E21B 17/0426 |
| 2018/0010402 A1 * | 1/2018 | Gushulak | ............ | E21B 17/0423 |
| 2018/0058152 A1 * | 3/2018 | Pollack | ................ | F16L 15/004 |
| 2018/0135783 A1 * | 5/2018 | Wickstrom | ........ | E21B 17/0426 |

* cited by examiner

MULTI-LEAD QUICK CONNECT THREADED CONNECTION

CROSS REFERENCE TO RELATED APPLICATION

The present application claims priority from the earlier filed provisional application, Ser. No. 62/216,596, filed Sep. 10, 2015, entitled "Multi-Lead Quick Connect Threaded Connection, by the same inventor.

BACKGROUND OF THE INVENTION

Field of the Invention

The invention relates to earth boring operations and in particular to an improved threaded connection or coupling for connecting tools utilized in a directional boring operation to a drill string.

Description of the Prior Art

Underground drilling, operations, including directional drilling operations, require a threaded connection for connecting various drilling tools, e.g., a drill bit, backreamer, or the like, to a drill string. The conventional directional drilling apparatus (horizontal directional drilling or HDD machine) generally includes a series of drill rods joined end to end by threaded connections or joint couplings to form a drill string. The drill string is typically pushed or pulled though the earth by means of a hydraulic cylinder or gear rack mounted on the HDD machine. A drill bit or head is attached to the end of the drill string with a coupling and will typically include a fluid nozzle for delivering a drilling fluid to assist in the boring operation. In other applications, tools such as reamers, impact machines, pipe bursters, and the like are attached to the end of a drill string with a threaded connection or coupling.

It is a major advantage to be able to connect such drill tools to a drill string using a connection which is easy to assembly and which is easy to disassemble. Low torque or no-torque couplings, referred to generally herein as "torque-less" connections, offer such functionality. During forward drilling, the joint coupling trails the leading bit where cutting is being performed. This subjects the coupling to a certain amount of abrasion. Also, such joint couplings between a drill string and tool are subjected to relatively severe torque loadings and longitudinal stresses in these operations.

Failure of a coupling or connection in a horizontal drilling or back reaming operation can result in a tool stuck in a borehole or pipe. Such a stuck tool often necessitates a costly and time consuming excavation operation to recover the tool, or to form a bore around the location at which the tool was lost. This results in costly in-ground repairs and parts replacements.

From the above discussion, it is clear that a means for extending the useful service lifetime of the threaded connection or coupling of the type under consideration is needed.

Despite various advances which have been made in the relevant arts, the useful life and strength of such connections can be improved upon. The present disclosure provides a torque-less coupling for directional drilling operations with improved strength and durability.

SUMMARY OF THE INVENTION

A threaded connection is shown for connecting a removable downhole tool assembly to a drill string. The threaded connection has a downhole end portion configured to interface with the removable downhole tool assembly and an up-hole end portion opposed to the downhole end portion. The up-hole end portion is configured to interface with the drill string as part of a torque-less coupling. The up-hole and downhole end portions of the assembly include an adapter body of the invention.

The up-hole end portion comprises a female end connection with a box end opening having a non-threaded, first circumferential surface having a first median inner diameter and a non-threaded, second circumferential surface having a second median inner diameter that is larger than the first diameter. A threaded tapered section extends between the first, and second, circumferential surfaces, the threaded tapered section including threads thereon. The threads on the threaded tapered section make up a multi-lead thread form. At least one of the non-threaded, first and second circumferential surfaces are slightly tapered. The female connection structure can be provided at an end of a starter rod, for example.

In one preferred form of the invention, the first and second non-threaded, circumferential surfaces are both slightly tapered surfaces. In that case, the non-threaded, slightly tapered first circumferential surface, the non-threaded, slightly tapered second circumferential surface and the threaded tapered section together comprise the box end opening of the female connection structure.

The downhole end portion of the threaded connection of the invention includes a connection structure which can be a male or female connection structure at a first end of an adapter body, wherein the adapter body has a second end defining a second, male connection structure. The second, male connection structure is a male or pin end including a tapered threaded section having major and minor outer diameters. The adapter body also has an intermediate region between the first connection structure and the second, male connection structure of the downhole portion of the threaded connection or coupling. A plurality of drive flats are provided at the intermediate region.

The starter rod or up-hole end portion of the threaded connection has a plurality of drive flats which are alignable with the drive flats provided on the intermediate region between the first and second male connection structures of the adapter body.

A pair of mating non-threaded, circumferential surfaces are defined on the exterior surface (pin end) of the adapter body which are separated by the tapered threaded section. The tapered threaded section includes a multi-lead thread form. The multi-lead thread form on the male connection structure (pin end) provided at the second end of the adapter body is designed to threadedly engage the mating multi-lead thread form provided in the box end of the female connection structure. The multi-lead thread forms are timed such that when the connection is threaded together and the drive flats on the adapter body contact the drive flats on the starter rod, the flats do not match up so that there is a miss-match of the drive flats. Preferably, the miss-matched flats are off from one another by an amount of rotation in the range from 1 to 20 degrees. For the drive flats on the adapter body and the drive flats on the starter rod to be aligned, it is necessary that a gap of about 0.010 to 0.150 inches be left between an end surface of the starter rod and a shoulder surface of the intermediate region of the adapter body.

A torque collar slides over a portion of the starter rod and adapter body when the two are assembled. The torque collar has internal flats which mate with the drive flats on the starter rod and adapter body to thereby prevent relative rotation between the two. No torque is transmitted through the threaded portions of the connection. All torque is transmitted through the torque collar.

Preferably, the multi-lead thread forms used in the threaded connection have from 2 to 6 thread leads. The number of multi-lead threads and the number of drive flats on the starter rod and adapter body are evenly divisible with respect to each other. For example, where the multi-lead thread forms each have four thread leads, the starter rod and adapter body will each have eight evenly spaced drive flats, thereby comprising orthogonal drive members.

Additional features and advantages will be apparent in the written description which follows.

DETAILED DESCRIPTION OF THE INVENTION

The preferred version of the invention presented in the following written description and the various features and advantageous details thereof are explained more fully with reference to the non-limiting examples included and as detailed in the description which follows. Descriptions of well-known components and processes and manufacturing techniques are omitted so as to not unnecessarily obscure the principal features of the invention as described herein. The examples used in the description which follows are intended merely to facilitate an understanding of ways in which the invention may be practiced and to further enable those skilled in the art to practice the invention. Accordingly, the examples should not be construed as limiting the scope of the claimed invention.

Figure 8:
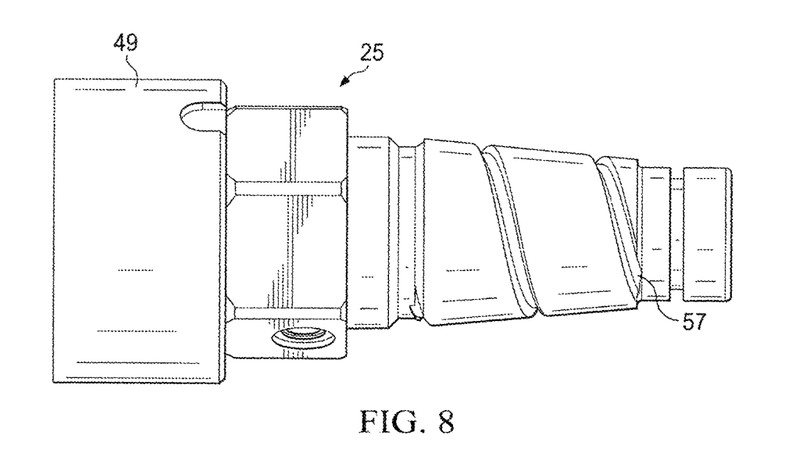
FIG. 8 is a side view of the octagonal drive member of FIG. 7 again showing the first thread of a multi-lead threading operation.
Figure 9:
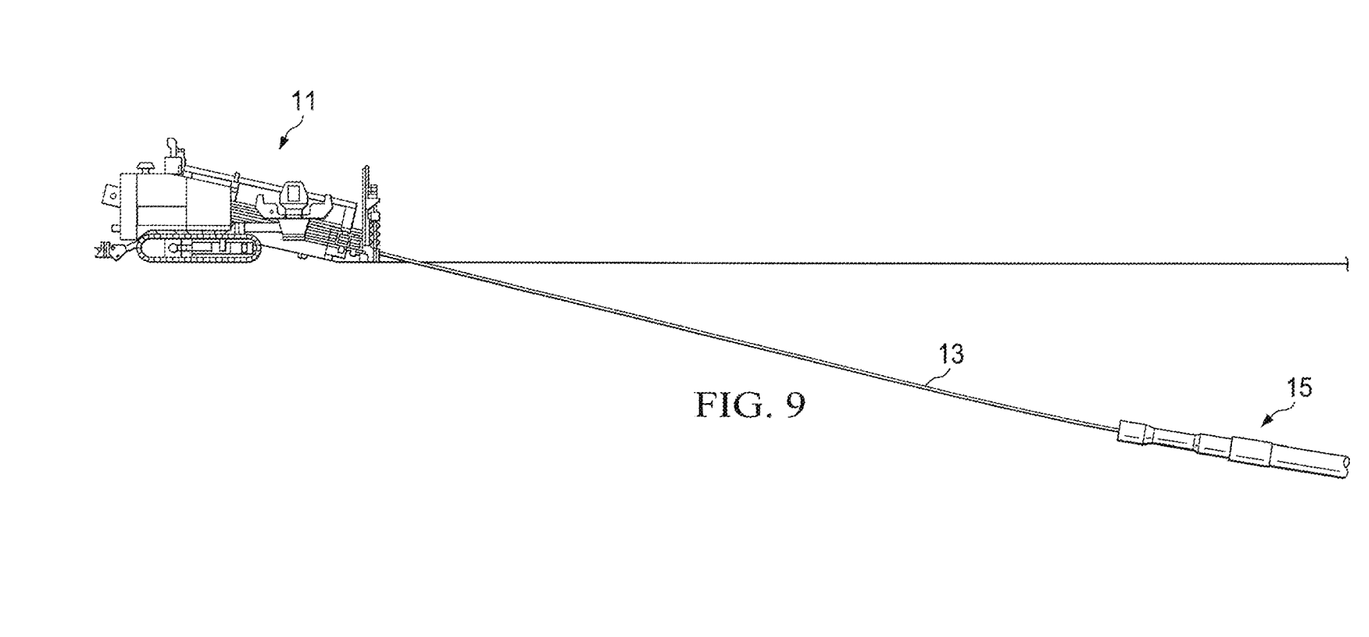
FIG. 9 is a simplified, schematic illustration of a horizontal directional drilling machine of the type which would utilize the threaded connection of the invention in the drill string thereof.

FIG. 9 is intended to be a simplified representation of a horizontal directional drilling (HDD) machine 11, the machine being shown driving a drill string 13 into the ground. The distal end of the drill string includes a drill tool assembly, illustrated in simplified fashion as 15. The threaded connection or coupling which is the subject of the present invention fits between an end of the drill string 13 and the drill tool assembly 15 and is shown in greater detail in FIGS. 1-8 and 10 of the drawings.

Figure 10:
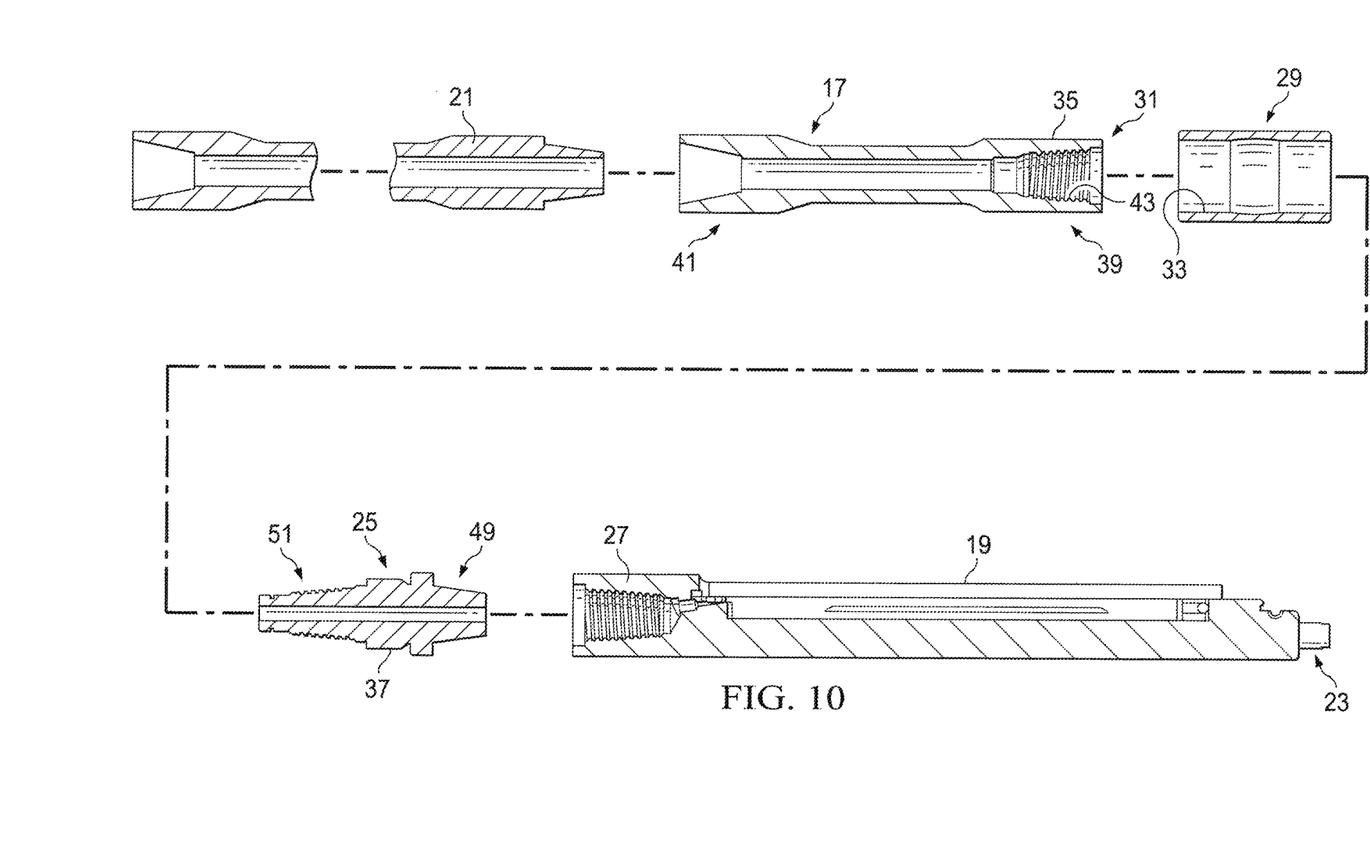
FIG. 10 is simplified cross sectional view of the various conventional components used in a drill string in a typical horizontal directional drilling operation and including the threaded connection of the invention.

FIG. 10 shows the principal components of the threaded connection or coupling used to join the drill string 13 and the drill tool assembly 15. The threaded connection, or coupling of the invention, is located between a starter rod 17 and a sonde housing 19. The starter rod 17, sometimes referred to as a pilot rod, (referred to herein as the "first member") is threadedly connected to the distal most (downhole most) drill rod member 21. The sonde housing 19 is designed to house a sonde therein and supports a drill bit (not shown) at its distal end 23. The torque-less connection of the invention connects the starter rod 17 and adapter 25. The principal components of the assembly, other than the novel quick connect threaded connection of the invention will be familiar to those skilled in the relevant arts.

As will be appreciated from FIG. 10, an adaptor body 25 is threadedly connected to the proximal end 27 of the sonde housing 19 and forms a part of the torque-less connection of the invention, which will be described in greater detail in the discussion which follows. The adaptor body 25 and sonde housing 19 are also referred to herein generically as a "second member." A torque collar 29 is provided to slide over a distal end 31 (FIG. 10) of the starter rod 17 and a portion of the adaptor body 25 to prevent relative rotation between the starter rod and adaptor (and thereby also prevent relative rotation between the starter rod 17 and the sonde housing 19). As will be apparent from the description which follows, the quick connect threaded connection of the invention is designed so that no torque is transmitted in the threaded portions of the connection. All torque is transmitted through the drive collar 29.

The inner surface of the torque or drive collar (29 in FIG. 10) is configured to engage specific external structural features on the distal end 31 of the starter rod 17 and on the exterior surface of the adaptor body 25. In the version of the invention shown in FIG. 2A, the collar includes internal flats 33 (see FIGS. 2 and 2A) that engage drive flats 35 on the distal end 31 of the starter rod 17 and drive flats 37 on the exterior of the adaptor body 25.

The threaded connection or coupling of the invention can be thought of as including a first member having a driving end and a driven end. In the preferred version of the invention shown, the first member is the starter rod 17. The drive end is shown as the distal end (39 in FIG. 10) and the driven end is shown as the proximal end 41. The proximal end 41 is threadedly connected to the downhole most drill rod 21. With further reference to FIG. 10, the driving end of a first member (e.g., the distal end 39 of the starter rod 17) includes a threaded tapered portion (the female or box end 43 shown in FIGS. 1 and 10).

The second member (adaptor body 25) includes a drive end 49 and a driven end 51 (see FIG. 10). The drive end 49 includes a threaded connection for attaching to a cutting tool (e.g., a sonde housing 19 supporting a drill bit, in this particular case). The driven end 51 is adapted for connection with the driving end (39 in FIG. 10) of the first member, starter rod 17. The particular threaded connection on the drive end 49 is indicated generically in FIG. 10, since this will be a conventional thread cut to the customer's specification.

The principal features of the improved threaded connection will now be described, primarily with reference to FIGS. 1-8. As described in general terms with respect to FIG. 10, the threaded connection of the invention, can thus be seen to have a downhole end portion (indicated generally at 49 in FIGS. 1 and 10) configured to interface with the removable downhole tool assembly, in this case sonde housing 19 and its associated drill bit. The threaded connection also has an up-hole end portion opposed to the downhole end portion, the up-hole end portion being configured to interface with the drill string as part of a torque-less coupling. The up-hole end portion (starter rod 17 in FIG. 1) includes a non-threaded, first circumferential surface (53 in FIG. 1) having a first median inner diameter and a non-threaded, second circumferential surface (55 in FIG. 1) having a second median inner diameter that is larger than the first diameter.

At least a selected one of the non-threaded, circumferential surfaces 53, 55 in the preferred embodiment of the invention are also "slightly tapered", in other words, non-purely cylindrical where "cylindrical" is understood to mean a geometric shape which is the surface formed by the points at a fixed distance from a given straight line which is the axis of the cylinder. In the example illustrated, the surfaces 53, 55, rather than being purely cylindrical, are cut on a taper of about ⅝ inches per foot. This is why the terms "first and second median inner diameters" are used to describe the "slightly tapered" nature of either or both of these surfaces. Because either or both of these surfaces are slightly tapered, their diameters vary along the longitudinal axis of the connection (generally at 18 in FIG. 1).

Figure 1:
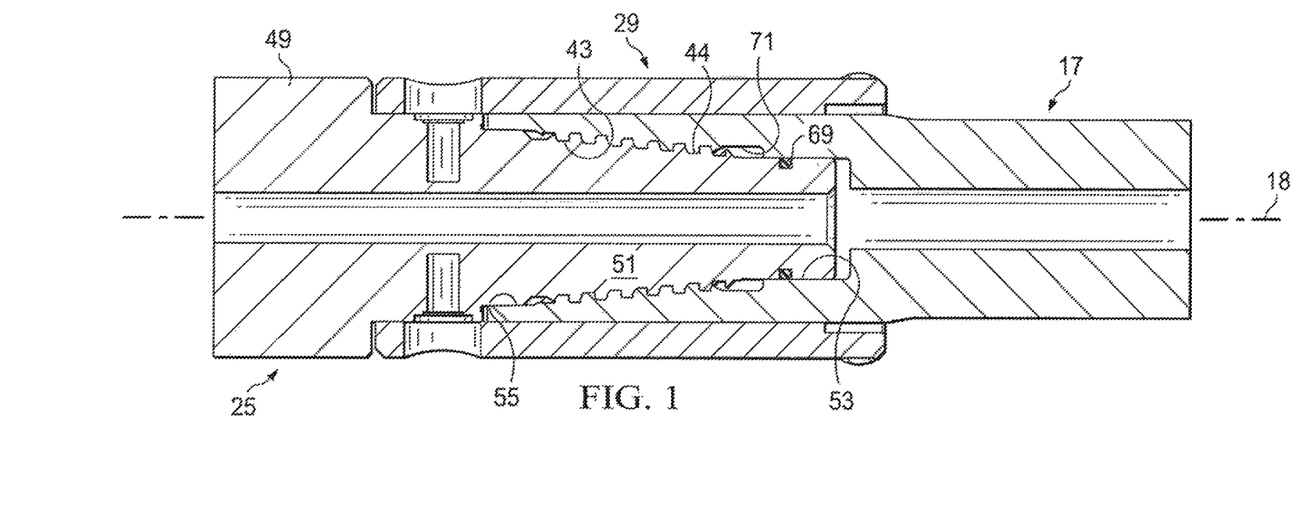
FIG. 1 is side, cross sectional view of the threaded connection or coupling of the invention shown in the assembled state.
Figure 2:
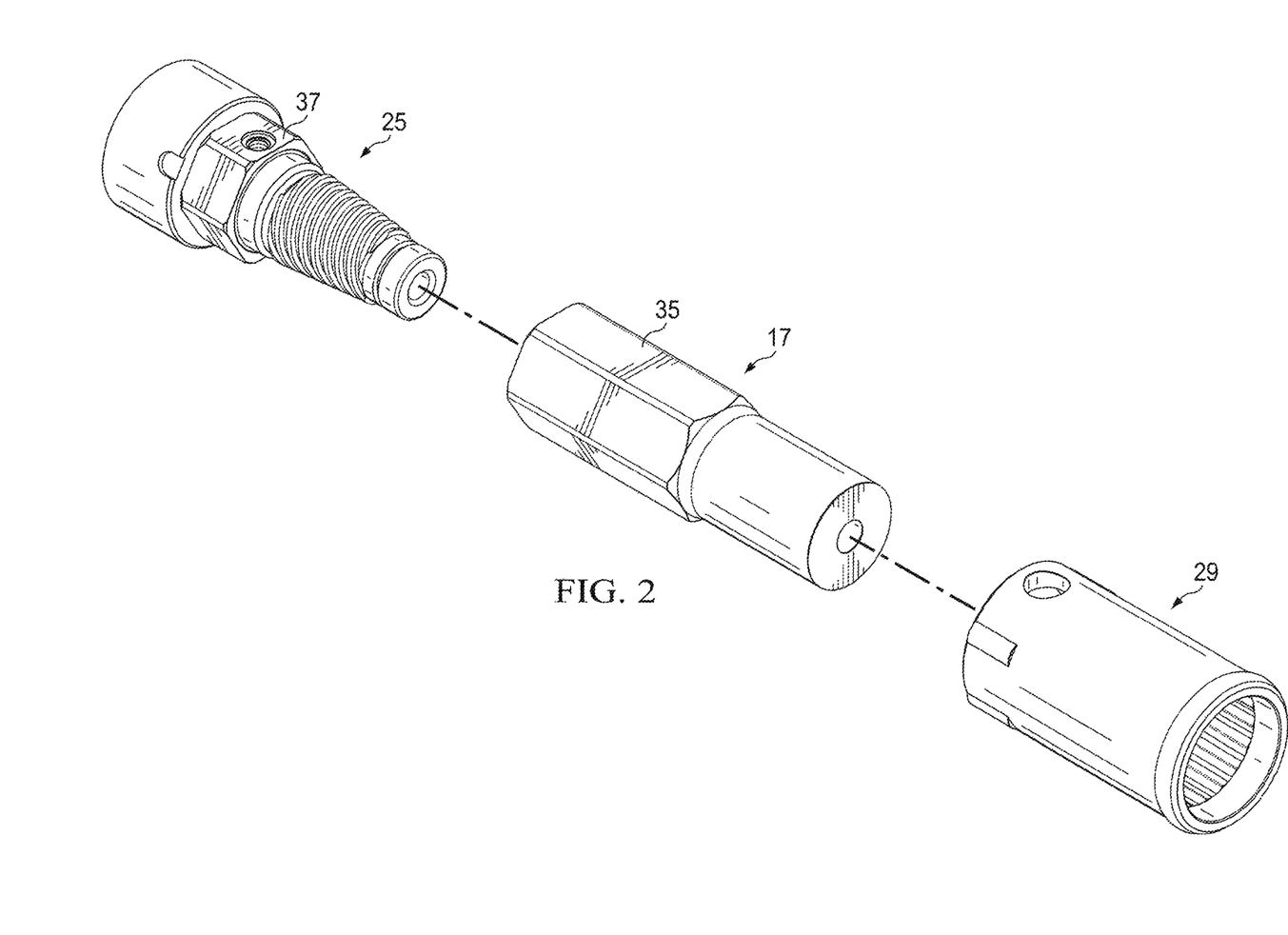
FIG. 2 is a perspective view of the various components of the threaded connection of FIG. 1, shown in exploded fashion.
Figure 2A:
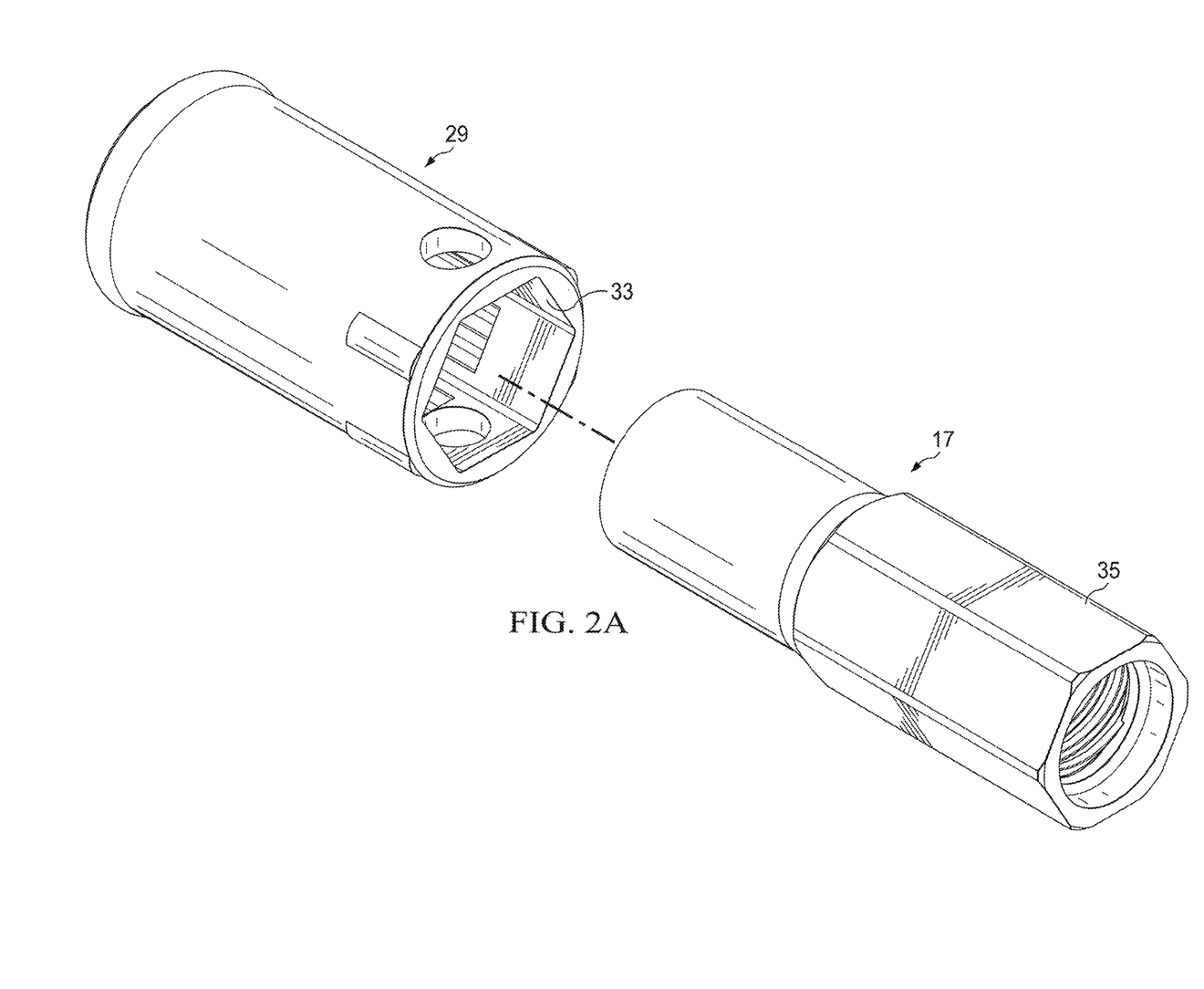
FIG. 2A is an isolated view of one of the octagonal drive members used in the threaded connection of the invention, which in this case is a starter rod, showing the drive member spaced apart from the associated drive collar.

A threaded tapered section (generally at 43 in FIG. 1) extends between the first and second non-threaded, circumferential surfaces, the threaded tapered section including threads thereon. Any of a number of different thread forms could be used in conjunction with the other features of the threaded connection of the invention. However, the threads which make up the thread forms for the surfaces illustrated as 43 and 44 in FIG. 1 are preferably "multi-start" of "multi-lead" threads. Multi-start threads are commonly found on a variety of consumer goods such as medicine bottles, beverage bottles, and the like, where just a short twist (e.g., a quarter of a turn) is desired for convenience in opening. The use of multi-start threads for oil field thread forms should improve the speed of pipe makeup, raise torque resistance, and aid in fatigue resistance. Depending on how much or little twist is needed on the particular product at hand, as many as six or more starts on the thread form may be employed. In the preferred form of the present invention, from two to six thread starts are used.

As an example of what is meant by the term "multi-start thread", a dual start thread would have two threads which typically start at circumferentially opposing locations on the pin member and the box member, with one thread being equally spaced circumferentially. In cross-section, the double-start thread on a pin member thus closely resembles a conventional single-start thread on a pin member, although the double start thread theoretically offers the advantage of a faster make-up since the double-start thread would typically make-up with half the number of revolutions of a single start thread. All of these types of threads with two, three, or more, i.e., a plurality of starts, will be referred to herein as being "multi-start" or "multi-lead" threads.

Figure 7:
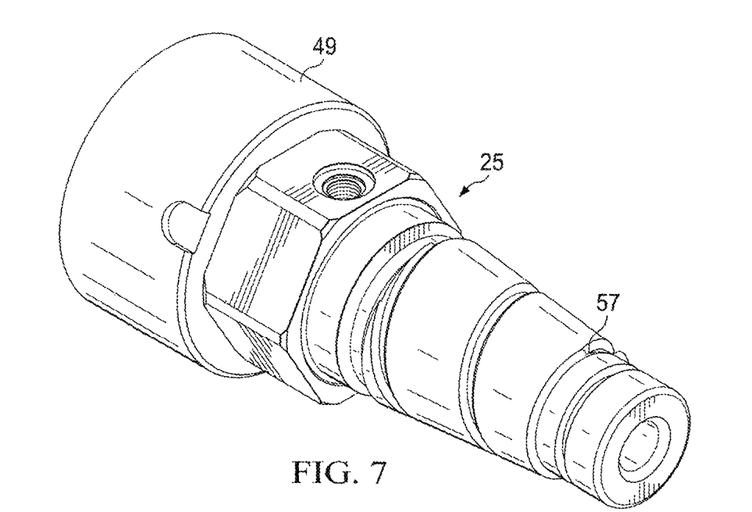
FIG. 7 is perspective view of the adapter body which includes the first octagonal drive member used in the threaded connection of the invention, showing the beginning threading step of the multi-lead thread used for the connection.

FIGS. 7 and 8 are used to illustrate, in simplified fashion, the beginning manufacture of the multi-start thread forms used in the threaded connection of the invention. The pin end of the adapter body 25 is provided with a first external thread, which has a thread start at 57 in FIG. 7. Thus, in the illustration, the pin end of the adapter body 25 is shown with one of the ultimate four thread leads which will be formed on the pin end for one preferred form of the invention. For a four lead thread, the "start" of the second thread would be indexed 90 degrees for the second start, 90 degrees for the third, 90 degrees for the fourth thread lead. In other words, for four threads, the starting points would be indexed 90 degrees each. If the connection had three leads, the starting points would be indexed 120 degrees each. If there were two thread leads, the starting points would be indexed 180 degrees each.

The mating box member (in this case starter rod 17) has an equal number of internal threads having an equal number of thread starts. The thread starts of each thread on the box member will typically be oriented symmetrically apart from one another and the thread starts of each thread on the pin member may be oriented symmetrically apart from one another.

Preferably, the multi-lead thread forms used in the threaded connection have from 2 to 6 thread leads. Also, to achieve the preferred timing aspect of the threaded connection of the invention, the number of multi-lead threads and the number of drive flats 35 on the starter rod and drive flats 37 on the adapter body are evenly divisible with respect to each other. For example, where the multi-lead thread forms each have four thread leads, and the starter rod and adapter body each have eight evenly spaced drive flats. Where the multi-lead forms each have two thread leads, the starter rod and adapter body each will have four evenly spaced drive flats, etc.

Figure 3:
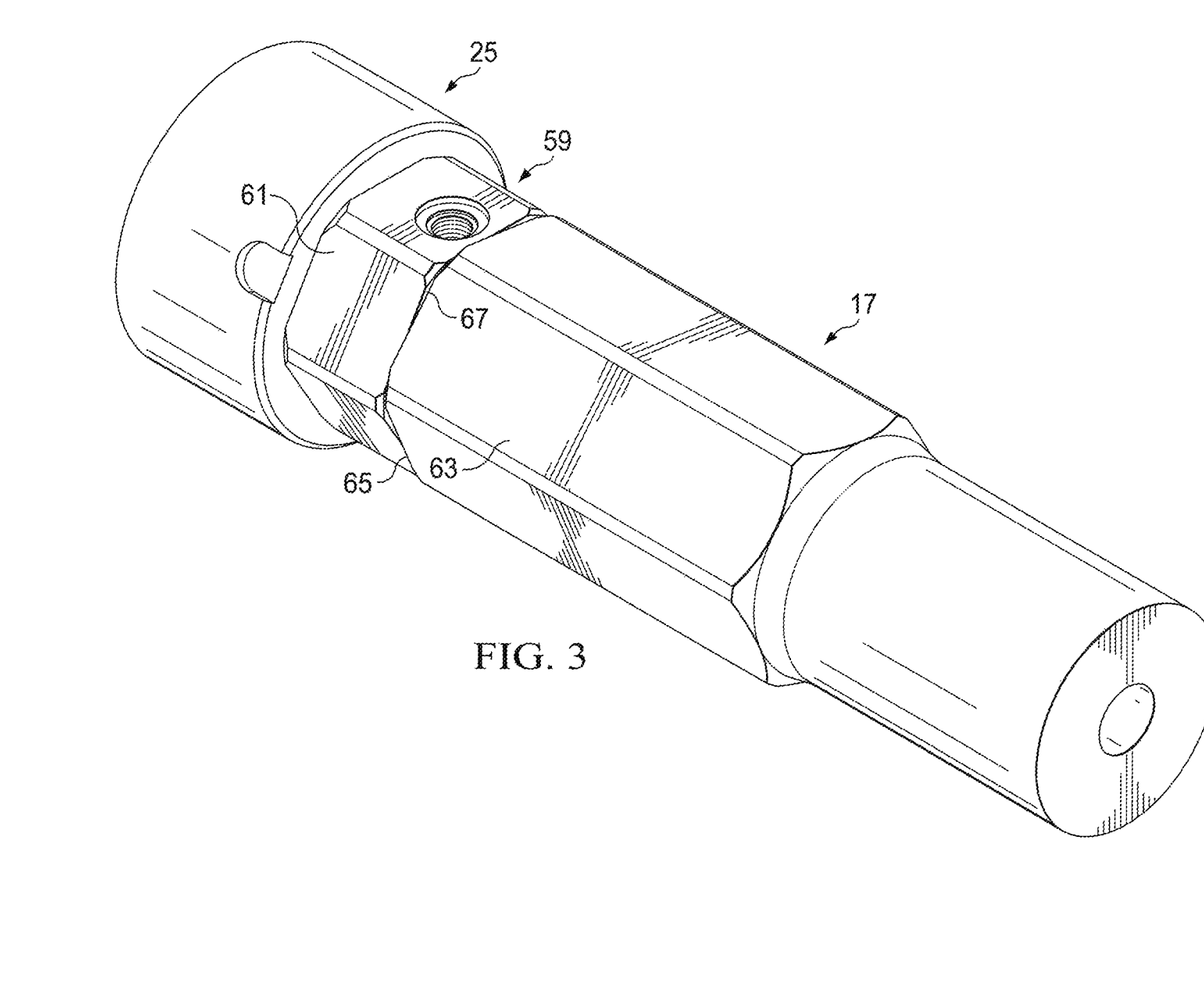
FIG. 3 is a perspective view of the first and second octagonal drive members, comprised of an adapter body and a starter rod, showing one state of the assembly thereof in which the flats on the respective octagonal drive members are misaligned.
Figure 4:
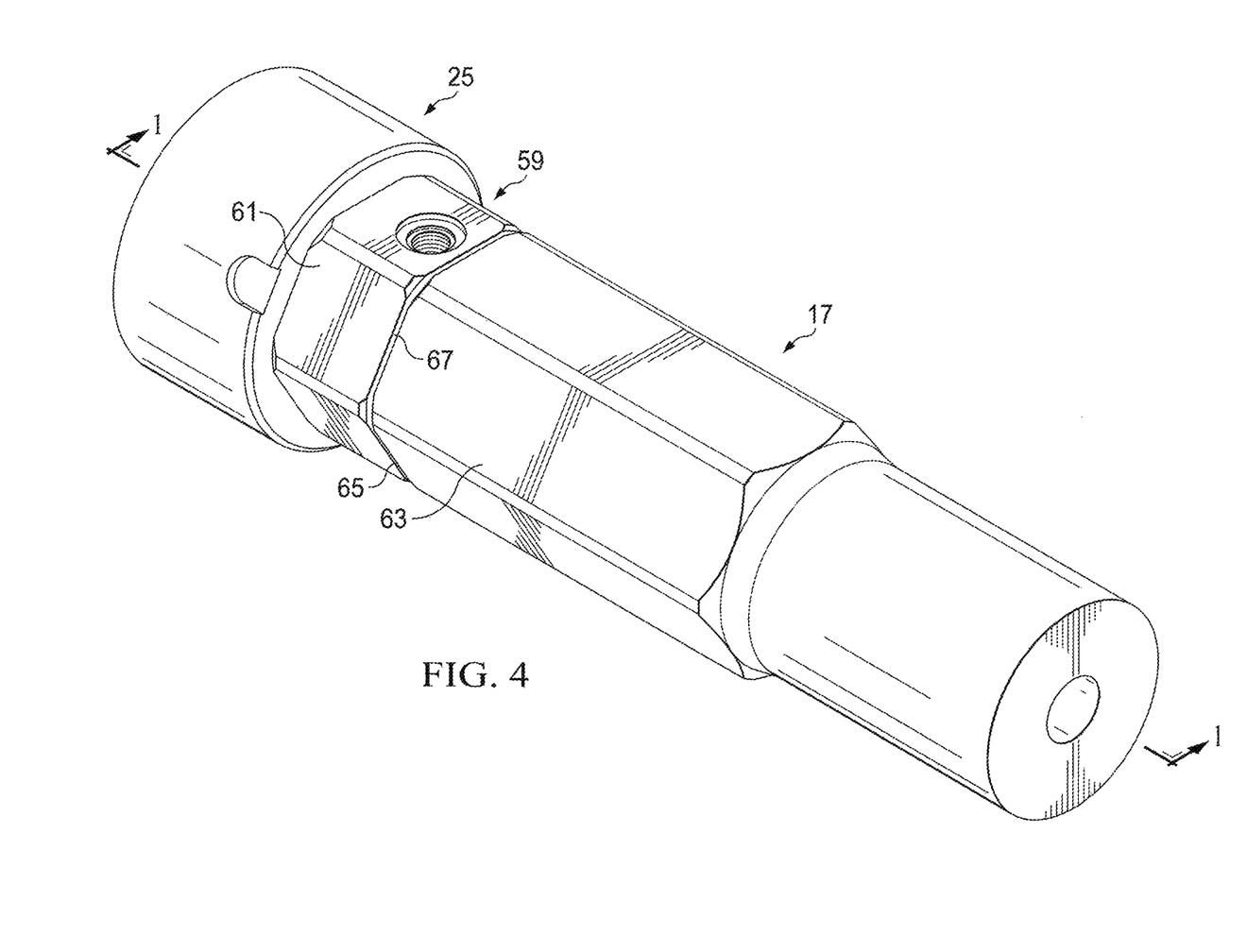
FIG. 4 is a view similar to FIG. 3, but showing another state of the assembly of the octagonal drive members in which the flats on the respective members are aligned and a gap exists between the mating end surfaces of the two members.
Figure 5:
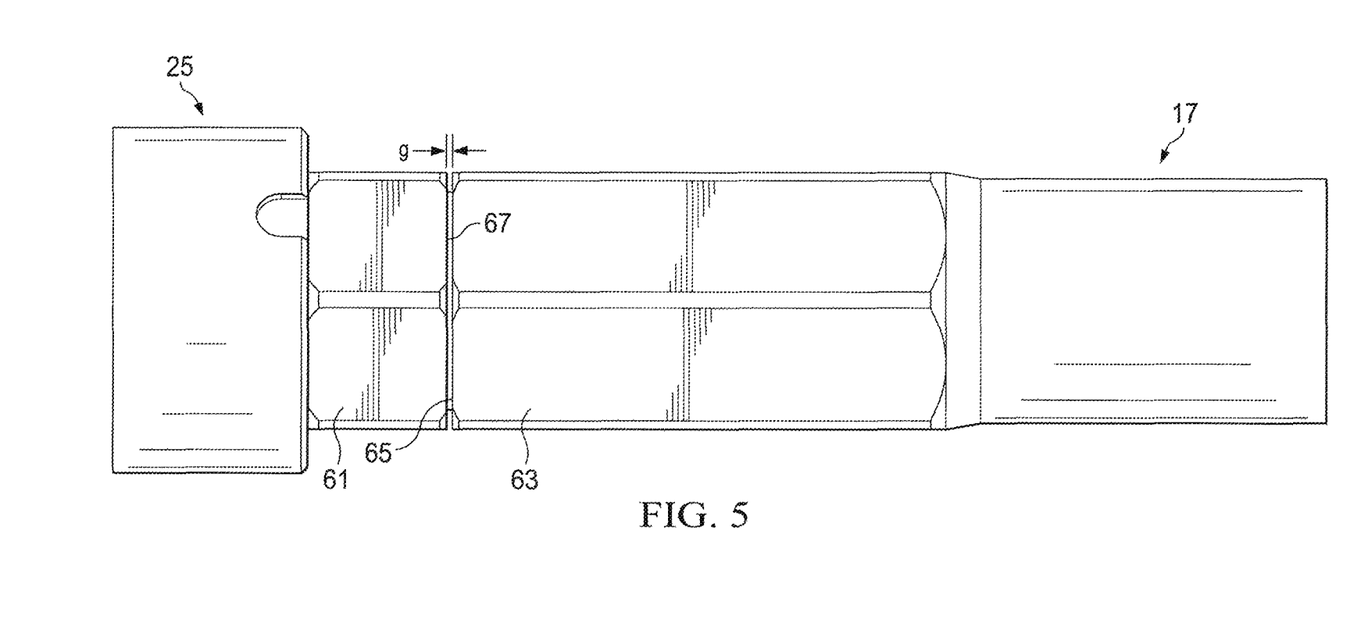
FIG. 5 is a side view of the assembled octagonal drive members of the threaded connection, showing the gap which exists between the mating end surfaces thereof in one state of the assembly operation.
Figure 6:
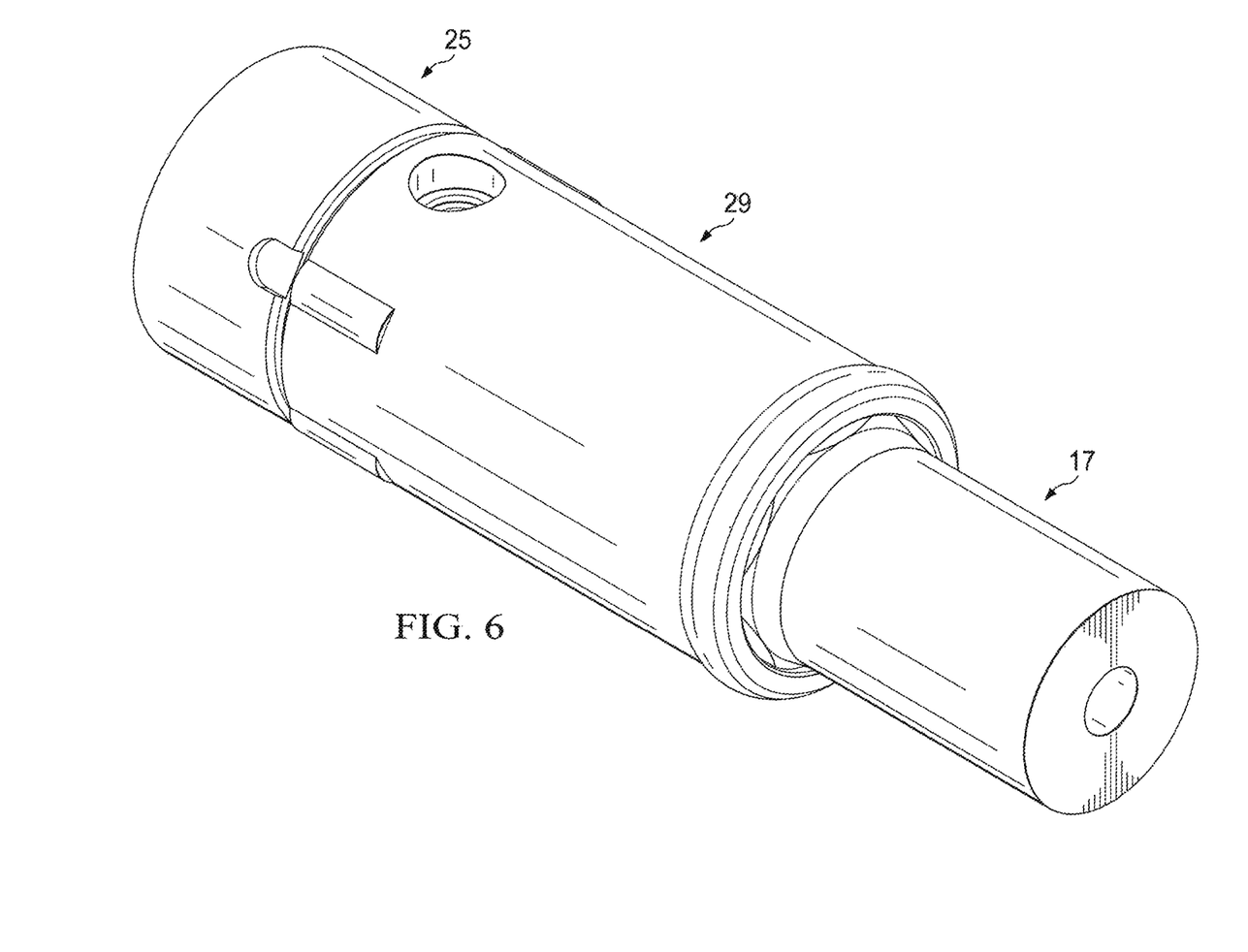
FIG. 6 is a perspective view of the assembled threaded connection, including the torque collar.

FIGS. 3-5 further illustrate the "timing" feature of the invention in which the multi-lead threads on the pin end of the adapter body 25 and the mating multi-lead threads on the interior or box-end recess of the starter rod 17 are "timed." As will be appreciated from FIGS. 1 and 3, and has been briefly discussed, the first connection structure of the threaded connection of the invention is provided at a first end of the adapter body 25, the adapter body also having a second end defining a second, male connection structure. The second, male connection structure comprises a tapered threaded section having major and minor outer diameters. The adapter body 25 defines an intermediate region (generally at 59 in FIG. 3) between the first connection structure and the second, male connection structure, and wherein a plurality of drive flats (such as flat 61) are provided at the intermediate region.

The starter rod 17 has a plurality of drive flats (such as flat 63) which are alignable with the drive flats 61 provided on the intermediate region between the first and second connection structures of the adapter body 25. The multi-lead thread form on the male connection structure provided at the second end of the adapter body 25 is designed to threadedly engage the mating multi-lead thread form provided in the female connection structure (of the starter rod 17). The multi-lead thread forms are timed such that when the connection is threaded together and the end surfaces of the drive flats on the adapter body 59 contact the drive flats on the starter rod 63, the flats do not match up so that there is a miss-match of the drive flats (see FIG. 3). In a preferred form of the invention, the miss-matched flats are off-set from one another by an amount of rotation in the range from about 1 to 20 degrees.

As shown in FIG. 4, for the drive flats 61 on the adapter body 25 and the drive flats 63 on the starter rod 17 to be aligned, it is necessary that a gap of about 0.010 to 0.130 inches be left between an end surface 65 of the starter rod 17 and a shoulder surface 67 of the intermediate region of the adapter body 25. The gap is illustrated as "g" in FIG. 5.

In the embodiment of the invention illustrated in FIG. 1, there is also a relief area (generally at 71 in FIG. 1) that is not threaded. It is configured to receive grease and foreign matter (e.g., rock and dirt) and thereby prevent the matter from jamming the connection between the first and second members, in addition, this area also act as a stress relief zone that distributes load at the transition, thereby avoiding stress concentrations, which increases the durability of the coupling. An O-ring seal 69 is also provided on the end of the adapter body 25.

The present disclosure also provides a method of connecting a drill tool to a drill rod. The method includes the steps of: contacting threads located at a proximate end of a drill tool member with threads located at a distal end of a drill rod member; threading the drill tool member to the drill rod member by relatively rotating the drill rod member and the drill tool member; and aligning structural features on an external surface of the drill tool member with structural features on an external surface of the drill rod member, as has previously been described. In the depicted embodiment the step of aligning the structural features includes counter rotating the drill rod assembly relative to the drill tool between 1 to 20 degrees.

The method further includes the step of sliding a torque collar 29 over a portion of the drill tool member and drill rod member, wherein the torque collar is configured to engage the structural features on the external surface of the drill tool member and drill rod member thereby preventing relative rotation between the drill tool member and the drill string member. No torque is transmitted through the threaded portions of the connection, making it quick to connect and disconnect. In the depicted embodiment the toque needed to unthread the drill rod assembly from the drill tool assembly is less than 50 foot pounds.

An invention has been provided with several advantages. The threaded connection of the invention can help to prevent the premature failure of a coupling joint or connection in a horizontal drilling or back reaming operation which could otherwise result in a tool stuck in a borehole or pipe. Field operators will appreciate that such a stuck tool often necessitates a costly and time consuming excavation operation to recover the tool, or to form a bore around the location at which the tool was lost. This results in costly in-ground repairs and parts replacements. The threaded connection of the invention provides a means for extending the useful service lifetime of the threaded connection of the type under consideration. The connection of the invention provides a torque-less coupling for directional drilling operations with improved strength and durability.

What is claimed is:

1. A threaded connection for connecting a removable downhole tool assembly to a drill string, the threaded connection comprising:
   a downhole end portion configured to interface with the removable downhole tool assembly;
   an up-hole end portion opposed to the downhole end portion, the up-hole end portion being configured to interface with the drill string as part of a torque-less coupling, the up-hole end portion including:
   a female end member with a non-threaded, first circumferential surface having a first median inner diameter and a non-threaded, second circumferential surface having a second median inner diameter that is larger than the first diameter;
   a threaded tapered section that extends between the first and second non-threaded, circumferential surfaces, the threaded tapered section including threads thereon;
   wherein the downhole end portion includes a male end member with a with a non-threaded, first circumferential surface having a first median outer diameter and a non-threaded, second circumferential surface having a second median outer diameter that is larger than the first diameter;
   a threaded tapered section that extends between the first and second non-threaded, circumferential surfaces, the threaded tapered section including threads thereon;
   wherein at least selected ones of the non-threaded, first and second circumferential surfaces on the male and female end members are slightly tapered;
   wherein the threads on the threaded tapered sections of the male and female end members make up a multi-lead thread form;
   wherein the male end member comprises an adapter body which includes a first connection structure provided at a first end of the adapter body, wherein the adapter body has a second end defining a second, male connection structure, wherein the second, male connection structure defines a tapered threaded section having major and minor outer diameters and wherein the adapter body defines an intermediate region between the first connection structure and the second male connection structures, and wherein a plurality of drive flats are provided at the intermediate region;
   wherein the female end member has a plurality of drive flats which are alignable with the drive flats provided on the intermediate region between the first and second connection structures of the adapter body; and
   wherein the multi-lead thread form on the male end member provided at the second end of the adapter body is designed to threadedly engage the mating multi-lead thread form provided in the female end member and wherein the multi-lead thread forms are timed such that when the connection is threaded together and the drive flats on the adapter body contact the drive flats on the starter rod, the flats do not match up so that there is a miss-match of the drive flats.

2. The threaded connection of claim 1, wherein the miss-matched flats are off-set from one another by an amount of rotation in the range from about 1 to 20 degrees.

3. The threaded connection of claim 2, wherein for the drive flats on the adapter body and the drive flats on the female end member to be aligned, it is necessary that a gap of about 0.010 to 0.150 inches be left between an end surface of the female end member and a shoulder surface of the intermediate region of the adapter body.

4. The threaded connection of claim 3, wherein the multi-lead thread forms used in the threaded connection have from 2 to 6 thread leads.

5. The threaded connection of claim 4, wherein the number of multi-lead threads and the number of flats on the female end member and adapter body are evenly divisible with respect to each other.

6. The threaded connection of claim 5, where the multi-lead thread forms each have four thread leads, and the female end member and adapter body each have eight evenly spaced flats.

\* \* \* \* \*